United States Patent [19]
Sekine et al.

[11] Patent Number: 5,111,533
[45] Date of Patent: May 5, 1992

[54] IMAGE PROCESSING SYSTEM FOR THE USE WITH IMAGE RECORDING APPARATUS

[75] Inventors: Hiroshi Sekine; Kazuman Taniuchi, both of Kanagawa, Japan

[73] Assignee: Fuji Xerox Co., Ltd., Tokyo, Japan

[21] Appl. No.: 717,404

[22] Filed: Jun. 17, 1991

[30] Foreign Application Priority Data

Jun. 19, 1990 [JP] Japan ................................ 2-160351

[51] Int. Cl.⁵ .................................................. G06A 15/00
[52] U.S. Cl. ................................................ 395/109; 358/80
[58] Field of Search ............... 395/109, 101, 102, 114, 395/115; 101/171; 346/154, 157; 355/326, 327, 328; 358/80, 75, 77, 78, 296

[56] References Cited

U.S. PATENT DOCUMENTS 3,553,371 1/1971 Surnagu ................................ 358/77
4,717,954 1/1988 Fujita et al. ........................ 358/80

Primary Examiner—Arthur G. Evans
Attorney, Agent, or Firm—Finnegan, Henderson, Farabow, Garrett and Dunner

[57] ABSTRACT

An image processing system for use with a color copier and other image recording apparatus. The system performs operations that comprise filling closed areas of interest with designated solid colors without uncolored holes.

8 Claims, 14 Drawing Sheets

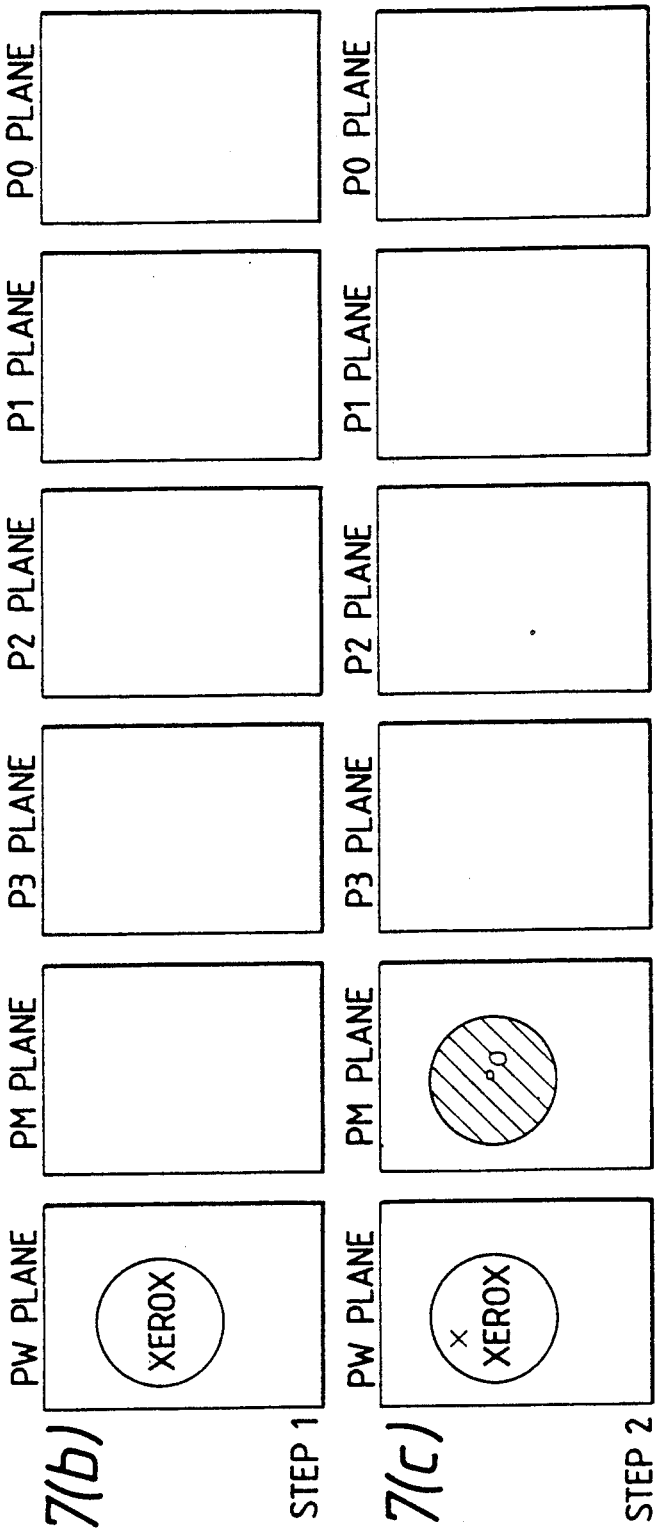

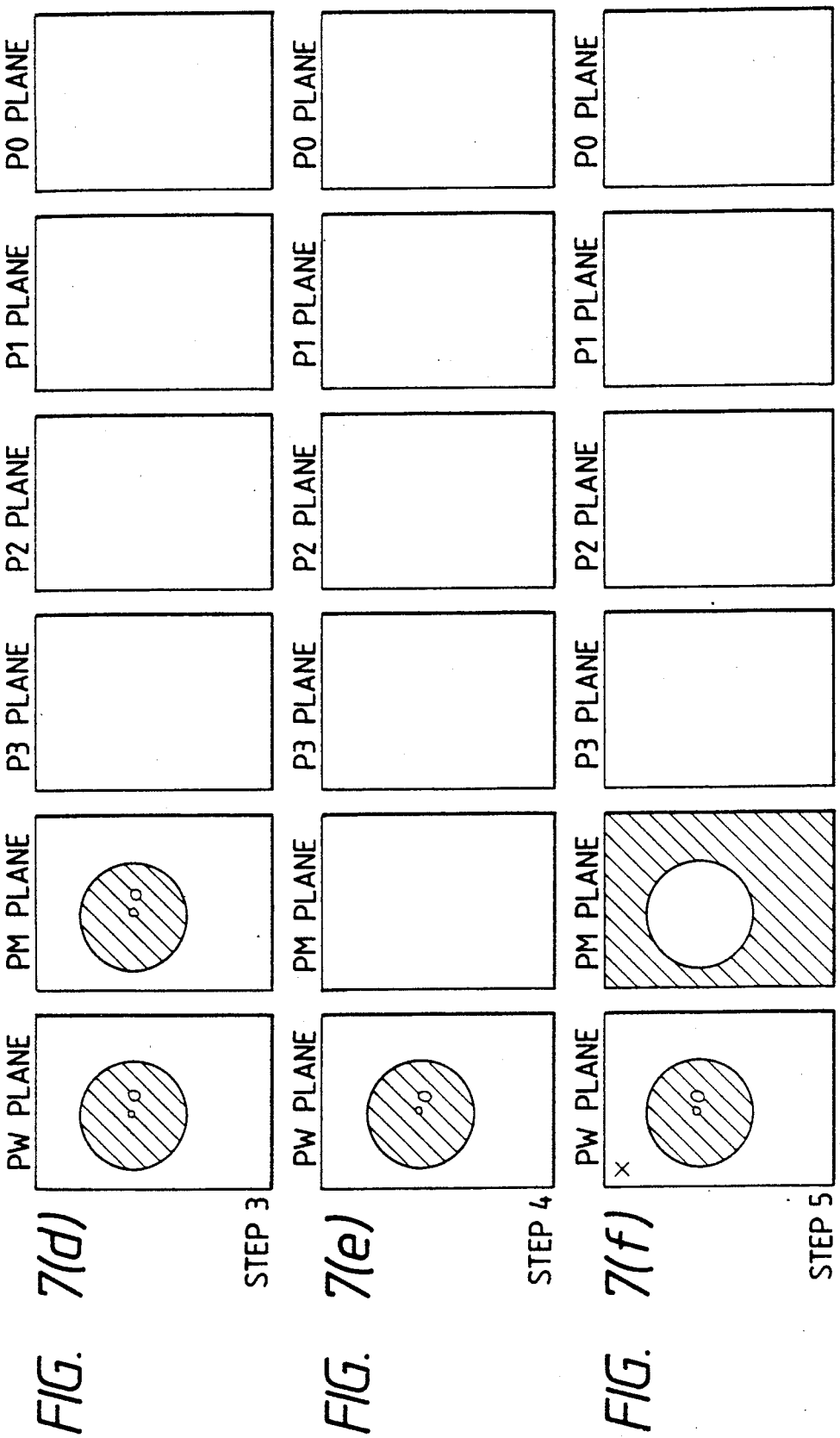

↓ STEP 6

↓ STEP 7

↓ STEP 8

↓ STEP 9

IMAGE PROCESSING SYSTEM FOR THE USE WITH IMAGE RECORDING APPARATUS

BACKGROUND OF THE INVENTION

This invention relates to an image processing system for use with a color copier and other image recording apparatus. More particularly, this invention relates to a system for performing operations that comprise filling closed areas of interest with designated solid colors (those operations are hereinafter referred to collectively as "painting").

Image recording apparatus are known that read the image of a document with a line sensor assembly composed of CCDs, etc. and that output a color hard copy after performing the necessary image processing. FIG. 10 shows schematically the configuration of such image recording apparatus. In FIG. 10, IIT (image input terminal) 101 has a line sensor assembly composed of CCDs, etc. and reads image information from a black-and-white or color document at a preset density, say, 16 dots/mm to generate signals for three primary colors B, G and R, which signals are converted to digital image data comprising a predetermined number of bits say 8 bits (256 gradations) (said digital image data is hereinafter referred to simply as "image data"), with the image data being then output to IPS (image processing system) 102.

Supplied with B, G and R image data, each composed of 8 bits, coming from IIT 101, IPS 102 converts those data to signals for four development colors Y (yellow), M (magenta), C (cyan) and K (black); thereafter, a signal X for a process color, or a color to be developed by the current development process, is selected and binary encoded to create ON/OFF data on the signal for the process color, which is then output to IOT (image output terminal) 103. IPS 102 performs various operations of data processing in order to improve the reproducibility of colors, gradations, fine details and other factor. While IPS 102 can be configured in various ways, the configuration previously proposed by the assignee is shown in FIG. 11.

An END (equivalent neutral density) conversion module 301 is such that optical read-out signals from a color document as obtained in IIT 101 are adjusted (converted) to color signals that have attained a gray balance. This module is equipped with 16 conversion tables which, when information is read from a gray document, converts it to B, G and R color separation signals with invariably the same graduation in correspondence to the readout level (black white) so that they are output to a color masking module 302.

The color masking module 302 converts the B, G and R color separation signals to signals for development colors Y, M and C by either matrix operations or table look-up.

A document size detection module 303 not only detects the document size in a prescanning more but also performs a frame erase operation, i.e., erasure of the platen color in a document reading/scanning mode. If the document's edges are not parallel to the platen edges or if it is not rectangular, the module 303 detects and stores maximum and minimum values for the horizontal and vertical directions (x1, x2, y1, y2).

A color conversion module 304 performs conversion in a specific area with a designated color. If the specific area is not a color conversion area, the module 304 sends out Y, M and C of the document unaltered in accordance with the area signal supplied from an area image control module 311 (to be described below). Within a color conversion area, the module 304 detects the designated color and sends out Y, M and C of the converted colors.

URC (undercolor removal) & black generation module 305 generates a sufficient amount of K to prevent color contamination and accordingly reduces Y, M and C in equal amounts (to remove the undercolor). The purpose of the module 305 is to prevent contamination with black and to insure that the saturation of low-value and high-saturation colors will not decrease.

A spatial filter module 306 comprises a digital filter and a modulation table that generate information on halftone dot removal and edge enhancement. If the document is photographic or printed by the halftone process, the module 306 performs smoothing and if the document is composed of characters or line drawings, the module 306 performs edge enhancement.

In response to ON/OFF signals from IPS 102, IOT 103 implements four copy cycles (in the case of four full-color copying) using Y, M, C and K process colors, whereby the reproduction of a full-color document is achieved. In practice, however, subtle adjustments that take into account the characteristics of IOT 103 are necessary in order to achieve faithful reproduction of colors that are theoretically determined by signal processing.

The (tone reproduction control) module 307 is used to provide improve color reproduction and has capabilities for performing various edit processes in accordance with area signals, including density adjustment, contrast adjustment, negative-to-positive reversal or vice versa, color balance adjustment, character mode and transparent synthesis.

A resizing module 308 performs resizing in the fast scan direction by reduction interpolation or additive interpolation when data is read from or written into a line buffer. Further, the module 308 is capable of performing a shift image process in the fast scan direction either by reading out data from the middle of the line buffer or by reading it with certain time lag. By reading the data repeatedly, iterations can be performed, whereas a mirror image operation can be accomplished by reading out the data in opposite direction. In the slow scan direction, the module 308 varies the scan speed of IIT 101 from twice to one-fourth the normal speed whereas it performs resizing from 50% to 400%.

A screen generator 309 converts gradation signals or process colors to binary code ON/OFF development color signals and outputs them to an IOT interface 310. The function of the screen generator 309 is to perform binary encoding and error diffusing operations by comparing matrices of threshold valves with values of data expressed in gradations.

The area image control module 311 is capable of setting a predetermined number of rectangular areas, say, 7 rectangles, and their priorities, with area control information being set in correspondence to the respective area. Various kinds of control information are available, including a color mode which selects among color conversion, a monochromatic color mode and a full-color mode, modulation select information on pictures, characters, etc., select information for TRC 307 and select information for screen generator 309. Those kinds of information are used to control the color masking module 302, color conversion module 304, UCR module 305, spatial filter 306 and TRC module 307.

An edit control module reads information not from rectangles but from pie charts and other designated areas of indefinite shape on the document and enables painting to be done in those areas. This module sets commands 0-15 as commands for performing fill pattern, fill logic, LOGO and other operations.

As described above, the signals produced by reading document's information from IIT 101 are first subjected to END conversion, then color masked. Thereafter, the document size that permits more efficient processing with full-color data is detected and frame erasure is performed. Following color conversion, the undercolor is removed and a black color is generated to permit handling of process colors. On the other hand, the spatial filer and processes such as color modulation, TRC and resizing are directed to data of process colors, whereby the volume of data to be processed in reduced compared to the full-color data and the number of necessary conversion tables is reduced to one-third of the tables that would otherwise be required. This permits a corresponding increase in the number of kinds of conversion tables so as to enhance the latitude in adjustment and the reproducibility of colors, gradations and fine details.

The IOT 103 which performs development in four colors Y, M, C and K with a toner or by some other suitable means may have a well known configuration. Suppose here the case where a photoreceptor typically composed of an organic light-sensitive belt is illuminated with laser light modulated with image data produced from IPS 102, whereupon a latent electrostatic image is formed and subsequently developed with a toner. The IOT 103 receives binary coded development color signals supplied from the screen generator 309 and reproduces a gray-scale image by turning on and off an elliptical laser beam that approximately measures 80 $\mu m$ by 60 $\mu m$ so as to correspond to a density of 16 dots/mm. The IOT 103 also detects the quantization error between the ON/OFF binary signal supplied from the screen generator 309 and the input gradation signal and performs error diffusion through a feedback loop, to thereby achieve better reproduction of gradations when viewed macroscopically.

A UI (user interface) 104 sets various copy modes including the number of copies to be made, the paper size, a color mode selection between copying in four full colors or copying in black-and-white, and an edit process. The UI 104 may have a well known configuration.

An edit pad 105 which is composed of a digitizer is used to set a specific area to be edited. In a painting operation to be implemented by the system of the present invention, the edit pad 105 is used to designate a signal point within a closed area of the document.

A CPU (central processing unit) 106 manages the overall operation of the image recording apparatus of interest by coordinating the operations of the individual components. Stated more specifically, the CPU 106 controls the operations of IIT 101, IPS 102 and IOT 103 based on the copy made set by UI 104 or the area or point set by the edit pad 105.

As described on the foregoing pages, the image recording apparatus having the configuration shown in FIG. 10 is capable of performing various edit processes on the image in various kinds of documents but, on the pages that follow, we concern ourselves with painting.

The following description is directed only to painting but it should be remembered that the apparatus is adapted to be capable of performing various other edit processes. It is also assumed in the following description that a black-and-white document is used in a paint mode.

Painting is implemented with an area command memory 312 and a color palette videos with 313. Suppose here that a closed area 108 drawn on the document 107 shown in FIG. 12 is to be filled with a solid red color. To begin with, the user manipulates UI 104 to select a paint mode from the menu of edit processes and select red as the color with which the area 108 is to be filled. At the same time, the user places the document 107 on the edit pad 105 and points to a desired point P within the closed area 108. Thereafter, the user places the document 107 on the platen and depresses the START button on UI 104 to instruct the commencement of copying. Then, CPU 106 first instructs IIT 101 to perform prescanning for reading the image on the document 107. At the same time, CPU 106 detects the closed area 108 and writes it into the area command memory 312. When this process ends, CPU 106 instructs IIT 101 to perform main scanning for starting the reading of image from the document 107. At the same time, CPU 106 reads closed area data from the area command memory 312 in synchronism with the main scanning. If the position of pixels being currently read is found to be interior to the closed area 108 on the basis of the closed area data, the color palette video switch 313 outputs red color data. If, on the other hand, the position of said pixels is found to be exterior to the closed area 108, the video switch 313 outputs image data associated with the document 107.

The above procedure enables painting to be accomplished easily by merely designating a closed area drawn on the documents and the color with which this area is to be filled. However, depending on the shape and size of the closed area, "holes" or portions that remain unfilled with the designated color sometimes occur within the designated closed area. Such "holes" are very conspicuous in closed areas that are filled with dark solid colors.

The reason for the occurrence of such "holes" in the paint mode is as follows. The closed area data written into the area command memory 312 is stored as image data. Needless to say, it is possible to detect the contour or outline of the closed area and store the associated addresses but this requires time-consuming arithmetic operations. Since it is necessary in painting to make quick decision as to whether the pixel being currently read in synchronism with the main scanning is interior or exterior to the designated closed area, it is not advisable to store the closed area data in the form of address data. Under these circumstances, the area command memory 312 may be composed as shown in FIG. 13, where "1" is written into pixels interior to the designated closed area 108 whereas "0" is written into exterior pixels. With this composition, pixels in the area command memory 312 are successively read out in synchronism with the main scanning and decision is made as to whether the pixel of interest is interior or exterior to the closed area depending upon whether said pixel has value "1" or "0". This obviously enables the painting operation to be implemented at high speed.

The foregoing discussion concerns the case where only one closed area need be painted. In order to insure that a multiple of closed areas can be painted with respective desired colors, the individual closed areas have to be distinguished from one another and this requires that the area command memory 312 have a large capacity. If there are 15 closed areas that need be painted, 4 bits are necessary to distinguish one closed area from another. In other words, four plane memories of the type shown in FIG. 13 are necessary. An example of this case is shown in FIG. 14, in which each of closed areas 110 is assigned area command $F_H$ whereas each of closed areas 111 is assigned area command $E_H$. In the case under consideration, 4-bit data are successively read out of the area command memory 312 in synchronism with the main scanning. If the readout data is $O_H$, the image data is produced as output from the color palette video switch 313; if the readout data is $F_H$, the color data set in each closed area 110 is produced as output; and if the readout data is $E_H$, the color data set in each closed area 111 is produced as output.

As mentioned above, a large capacity is necessary for storing more than one set of closed area data as image data. Suppose here that the image recording apparatus of interest is capable of reading documents of sizes up to A3 and also suppose that each of the four plane memories in the area command memory 312 has a density of 16 dots/mm which is equal to the readout density of IIT 101. then, at least $297 \times 420 \times 16^2$ bits are necessary for each plane memory and the area command memory 312, taken as a whole, needs a huge capacity, which only results in high cost. However, supplying high-quality apparatus at low cost is one of the great demands of modern industry and cost reduction is a requirement that has to be satisfied by all means. It is therefore necessary to reduce the capacity of the area command memory 312. Suppose here that the image data of 16 bits/mm that is read from IIT 101 is compressed to one-fourth the initial value and stored in the area command memory 312 at a density of 4 dots/mm. Then, the closed area data stored in the area command memory 312 is as shown in FIG. 15. If the image data read by IIT 101 at a density of 16 dots/mm is as shown in FIG. 15a, the $4 \times 4$ pixels in that image data re compressed to s single pixel in the area command memory 312. Let us assume here that the pixels in the area command memory are rendered black if at lest one of the 4 $\times 4$ pixels is black, or having value "1". Then, the contour line of the closed area is as indicated by hatched areas in FIG. 15b and only the unfilled pixels forming a hole as indicated by 113 are recognized to be interior to the closed area and assigned value "1". during the main scanning, the thus obtained closed area data is readout in synchronism and decision is made as to whether the pixels in the image data being currently read as enlarged to $4 \times 4$ pixels interior or exterior to the closed area. In the case shown in FIG. 15b, it is the pixels indicated by 113 in the area command memory 113 that are judged to be interior to the closed area and, eventually, the area hatched by lines sloping downward to the right in FIG. 15c remains unfilled to leave a hole.

As discussed above, the occurrence of "holes" in painting operations has been unavoidable if the capacity of the area command memory is reduced. This problem is particularly series with a closed area that is painted with a dark color since the "hole" is surrounded by the dark color and the black contour line of the closed area and hence is very unseemly.

SUMMARY OF THE INVENTION

The present invention has been achieved under these circumstances and has as an object providing an image processing system for use with image recording apparatus that is capable of performing painting without producing "holes" even if the closed area data which is stored as image data has a density different from that of image reading with an IIT.

The image processing system of the present invention is intended to be used with an image recording apparatus comprising IIT 101, IPS 102, IOT 103, UI 104, edit 105 which is a coordinate input means for obtaining information on the coordinates of an arbitrary point in a document of interest, and control unit 106 which manages the overall operation of the apparatus by coordinating the individual components. The system is characterized in that IPS 102 comprises the following first to fifth means. The first means is an image reducing/enlarging circuit 2, by which image data having a density of, for example, 16 dots/mm is converted to data having a lower density of, for example, 4 dots/mm. The second means is an image processing circuit 4 which generates an area command based on both the output of the image reducing/enlarging circuit 2 and the coordinates of a point designated with the edit pad 105. The area commands generated by the image processing circuit 4 are stored in a plane memory 5 which is the third means. The processes described above are implemented in a prescanning mode. Since the density of area commands is lower than that of image data, the capacity of the plane memory 5 can be sufficiently reduced to achieve cost reduction.

In the main scanning mode, area commands are read out of the plane memory 5 and converted (enlarged) to the initial density by the image reducing/enlarging circuit 2 which serves not only as the first means but also as the fourth means; the area commands are then output in the order of pixels as they are read out by IIT 101. Subsequently, the region in which the area commands have been set is enlarged by the fifth means by a predetermined number of bits in the direction in which "holes" are to occur. In the system shown in FIG. 1, the image processing circuit 4 also serves as the fifth means.

As described above briefly, the system of the present invention is adapted to enlarge the region in which the area commands are set and this permits an expansion of the interior of a closed area designated by the user, whereby the occurrence of "holes" which has been frequently encountered with the conventional implementation of painting operations can be effectively prevented.

DETAILED DESCRIPTION OF THE INVENTION

Embodiments of the present invention are described below with reference to the accompanying drawings, particularly to FIGS. 1-11.

Figure 1:
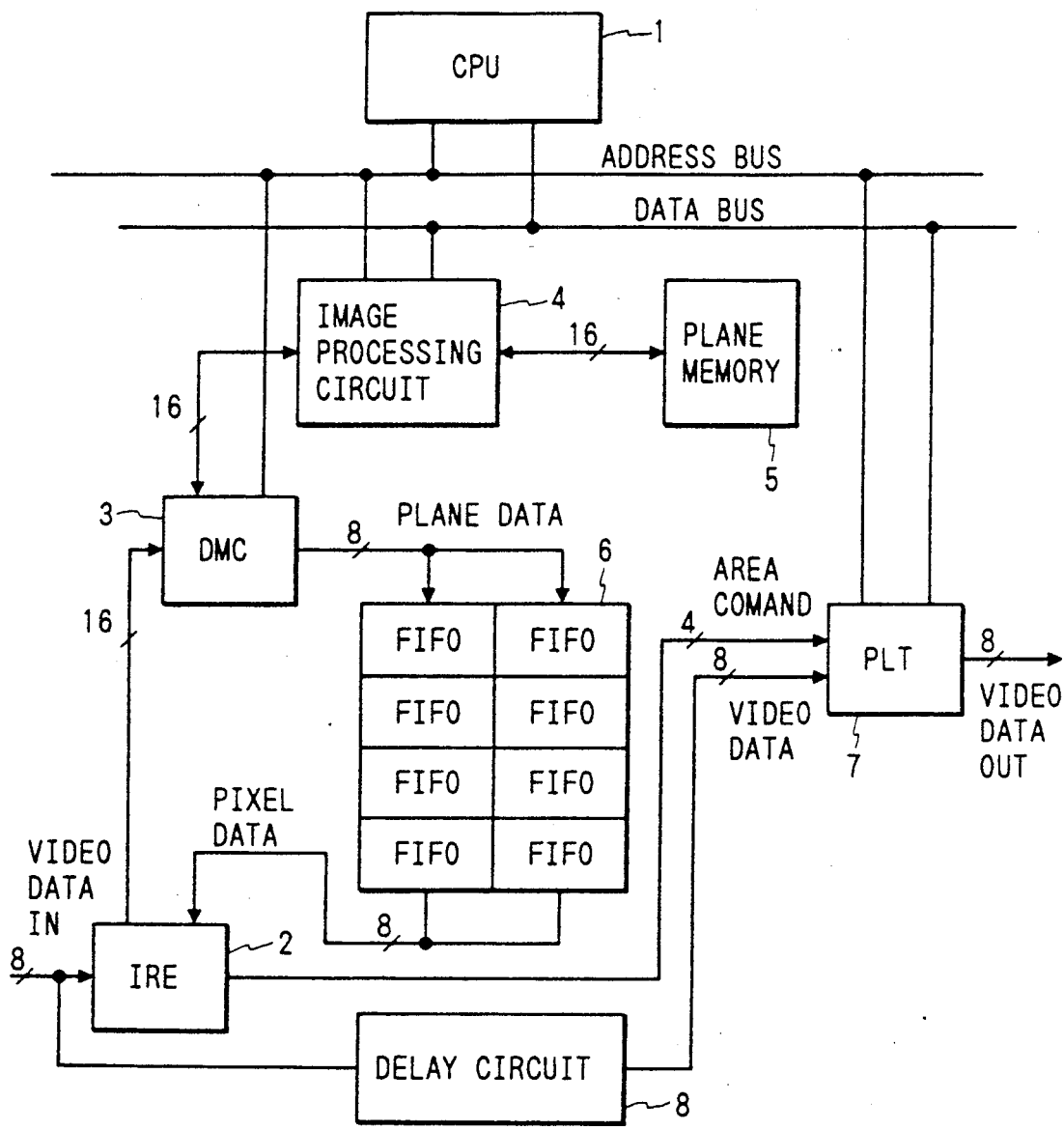
FIG. 1 is a block diagram showing the configuration of an image processing system for use with image recording apparatus according to an embodiment of the present invention.

FIG. 1 is a block diagram showing the configuration of an image processing system for use with image recording apparatus according to an embodiment of the present invention. Shown by 1 in the figure is a CPU; 2 is an image reducing/enlarging circuit (which is hereinafter abbreviated as "IRE"); 3 is a direct memory access controller (which is hereinafter abbreviated as "DMC"); 4 is an image processing circuit; 5 is a plane memory; 6 is an FIFO (first in-first out memory); 7 is a palette (PLT) circuit; and 8 is a delay circuit. An example of the image processing circuit is a commercially available graphic controller such as AGDC ($\mu$PD72120) manufactured by NEC.

Figure 10:
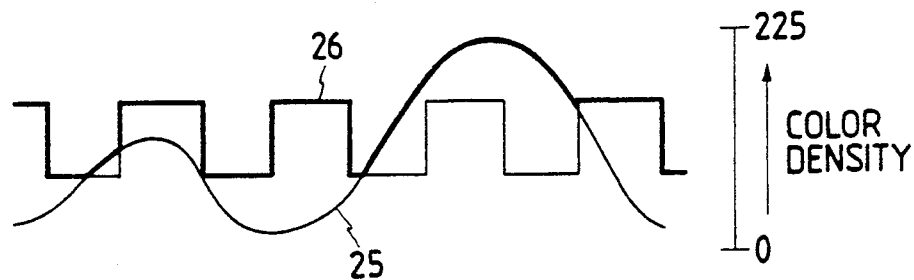
FIG. 10 is a diagram illustrating the operation of a multiplexed.
Figure 11:
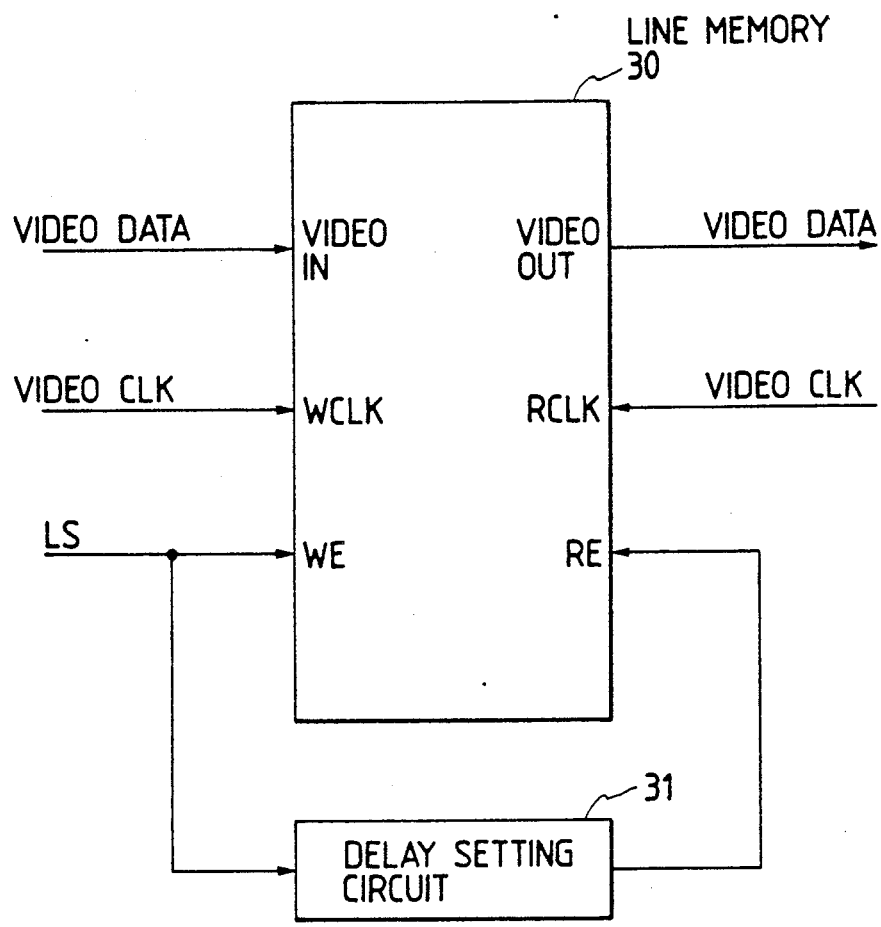
FIG. 11 is a diagram showing an example of the configuration of an image data delay circuit.
Figure 12:
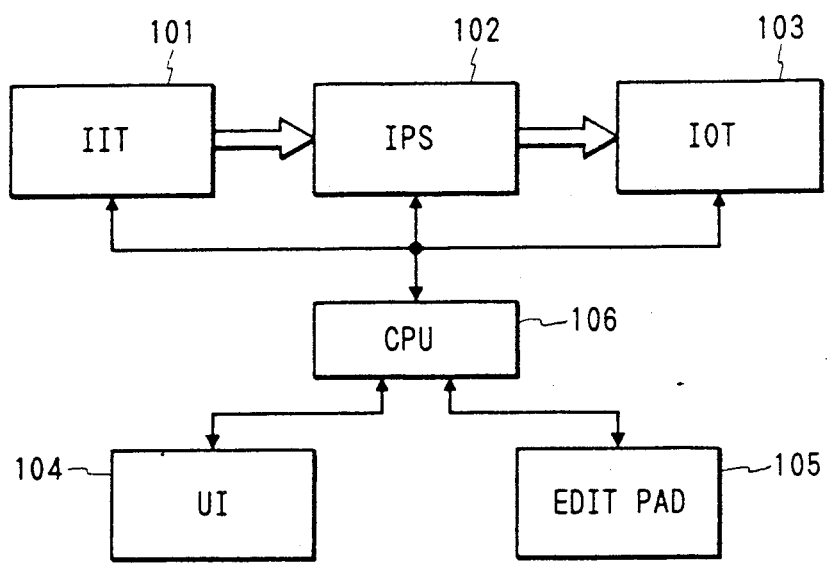
FIG. 12 is a block diagram showing schematically an example of the configuration of a prior art image recording apparatus.

In the configuration shown in FIG. 1, CPU 1 is equivalent to CPU 106 shown in FIG. 10, and PLT 7 is equivalent to the color palette video switch 313 shown in FIG. 11. The other components, IRE 2, DMC 3, image processing circuit 4, plane memory 5, FIFO 6 and delay circuit 8 make up the area command memory 312 shown in FIG. 11. IIT 101, IOT 103, UI 104 and edit pad 105 shown in FIG. 10 and the other modules of IPS 102 are omitted from FIG. 1 since all of them are similar to those used in the prior art system.

The operation of the system shown in FIG. 1 is described below with reference to a painting operation.

First, a paint mode and a color are selected by means of a UI (not shown) and a point is designated by an edit pad (also not shown), with the system being instructed for a start. Then, CPU 1 reads in all the input data and instructs an IIT (not shown) to perform prescanning. The image data of the document as read by prescanning is density-converted by IRE 2, with the values of the converted pixels being determined simultaneously. In the following description, it is assumed that the IIT reads image data at a density of 16 dots/mm whereas the readout data is compressed to a density of 4 dots/mm in IRE 2. The configuration for achieving this compression of pixel density has been known in the art and will not be described here in detail.

Various methods are available for determining as to whether the density-converted pixels should be rendered black or white. One possible method has already been described above in connection with the prior art and according to that method, a converted pixel is rendered black if at least one of the 4×4 pixels that have been read by the IIT is a black pixel. Alternatively, about 9 pixels in predetermined positions among the 16 (4×4) pixels may be evaluated and if at least one of them is found to be a black pixel, the converted pixels may be rendered black.

The thus converted pixel data is transferred by DMC 3 to the image processing circuit 4, in which data that represents a designated closed area (which data is hereinafter referred to as "an area command") is generated for storage in the plane memory 5.

Figure 2:
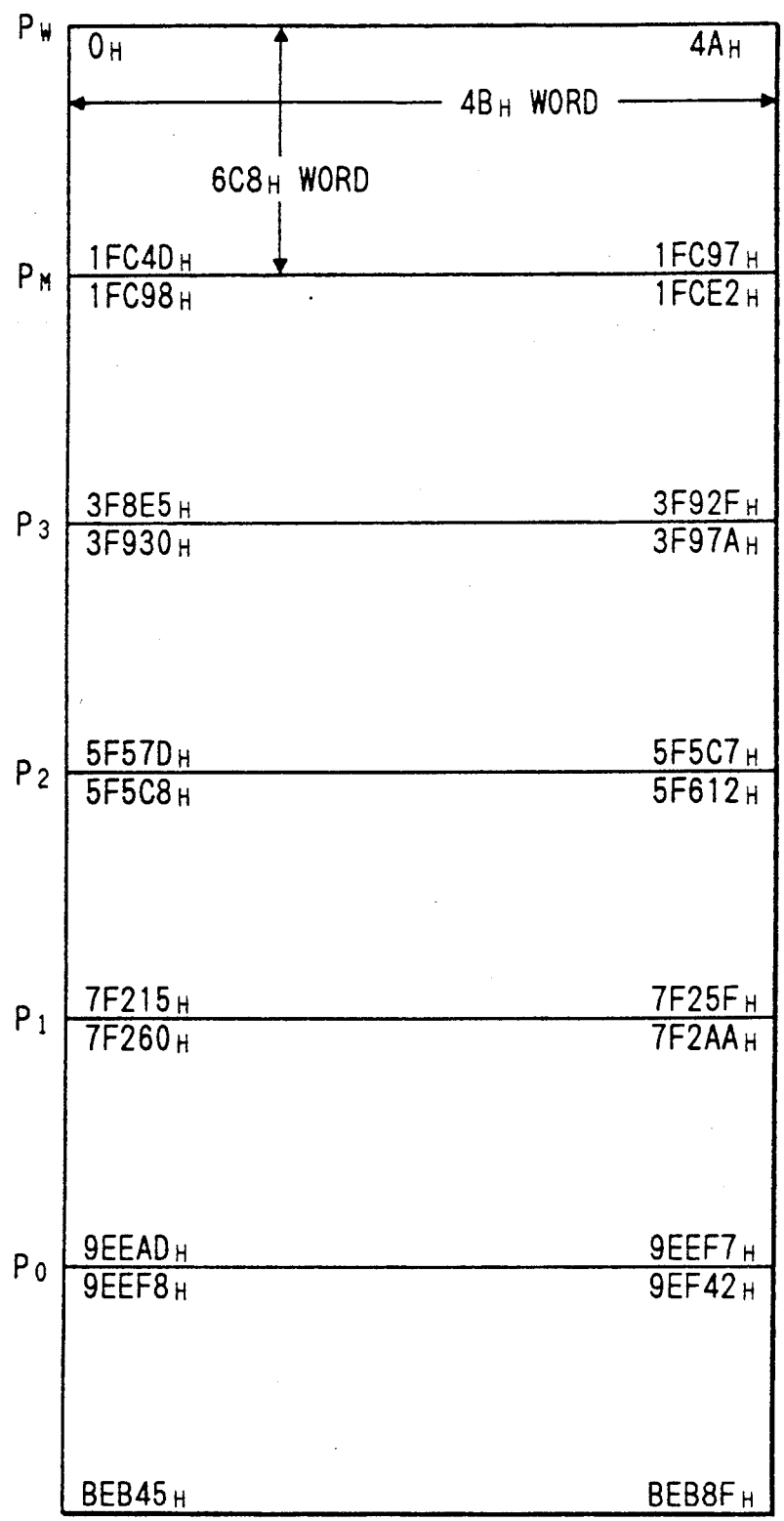
FIG. 2 is a diagram showing an example of the configuration of a plane memory.

As shown in FIG. 2, the plane memory 5 is composed of a RAM having word addresses $O_H$–$BEB8F_H$ and those areas are divided into a work plane $P_W$ and a mask plane $P_M$, both being work areas, and four planes $P_3$–$P_0$ into which are commands are to be actually stored.

Figure 3A:
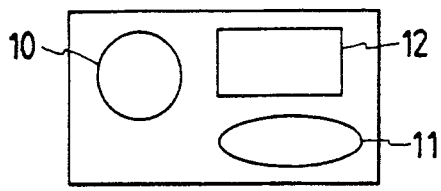
FIG. 3(a) to 3(e) shows the concept of a work plane for illustrating the process of generating area commands.
Figure 4A:
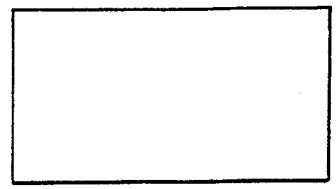
FIG. 4(a) to 4(e) shows the concept of a mask plane for illustrating the process of generating area commands.
Figure 3B:
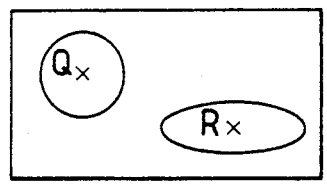
Figure 4B:
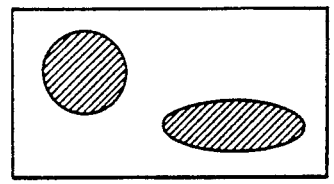

The process of generating area commands in the configuration described above is discussed below with reference to FIGS. 3 and 4. FIGS. 3 and 4 are conceptual diagrams showing the process of generating area commands in the work plane $P_W$ and the mask plane $P_M$, respectively. It is assumed here that the pixels in hatched areas have the value "1" whereas the pixels in the other areas have the value "0". In the first step of the process, the density-converted pixel data sent from IRE 2 are successively written into the work plane $P_W$ as shown in FIG. 3a. In this case, the mask plane $P_M$ is in a cleared state as shown in FIG. 4a. When the writing of the pixel data into the work plane $P_W$ ends, the image processing circuit 4 fills with "1" those pixels on the mask plane $P_M$ within the area enclosed with the control line of a closed area which have the value "1", as referenced to the coordinates that correspond to user-designated points Q and R (see FIG. 3b) which are informed from CPU 1 (FIG. 4b). Obviously, any of the other closed areas that are drawn on the document will not be painted on the mask plane $P_M$ if no point interior to those areas has been designated. In other words, even if three closed areas as indicated by 10, 11 and 12 in FIG. 3a are obtained at the stage where image has been read from the document, the contour of the closed area 12 in which no interior points have been designated will not be extracted.

Figure 3C:
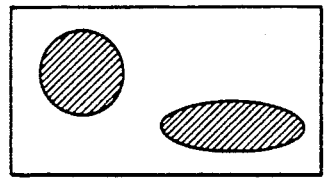
Figure 4C:
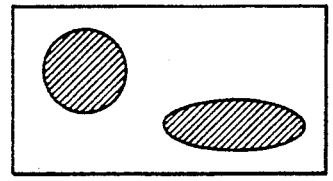
Figure 3D:
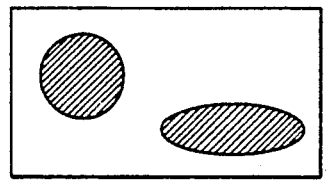
Figure 4D:
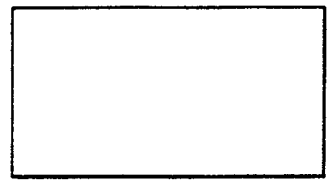
Figure 3E:
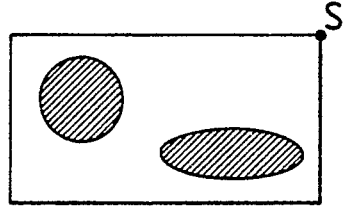
Figure 4E:
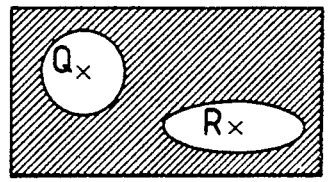

In the next step, the image processing circuit 4 copies the written pattern from the mask plane $P_M$ to the work plan $P_W$ as shown in FIG. 3c. In this instance, the state of the mask plane $P_M$ is as shown in FIG. 4c and is the same as the state shown in FIG. 4b. When the pattern copying from the mask plane $P_M$ to the work plane $P_W$ ends, the image processing circuit 4 erases the pattern on the mask pane $P_M$ (FIGS. 3d and 4d) and copies it onto the mask plane $P_M$ starting at the address of the upper right corner S (FIG. 3e) of the work plane $P_W$. At the same time reversal of pixel values occurs and the pixels with the value "1" are assigned "0" and those with the value "0" assigned "1".

Figure 14:
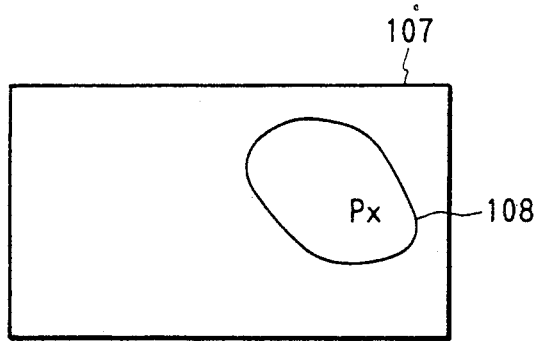
FIG. 14 is a diagram for illustrating the procedure of a painting operation.

These procedures complete the process of extracting the contour lines of designated closed areas. Thereafter, the image processing circuit 4 causes the pattern on the mask plane $P_M$ to be developed onto planes $P_3$–$P_0$ originating at the designated points Q and R in accordance with the procedure already described. First, a 4-bit area command is assigned to each of the closed areas. Suppose here that CPU 1 has assigned $F_H$ to the closed area containing the designated point Q, and $E_H$ to the closed area containing the designated point R. Then, the image processing circuit 4 writes the respective pixel values into planes $P_3$–$P_0$, with the high order bit assigned to the plane $P_3$ and the low order bit to the plane $P_0$. This completes the process of generating area commands as shown in FIG. 14. The area commands in the respective closed area are assigned in the order from $F_H$ to $O_H$ as the designated points have been registered, or in the reverse order. At the same time, CPU 1 notifies PLT 7 of the command for performing painting of each area and of the color data designated for each area.

Figure 15:
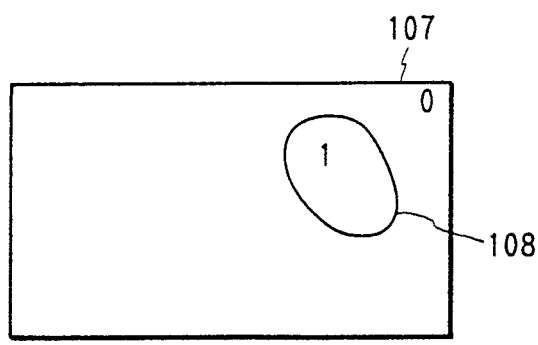
FIG. 15 is a diagram for illustrating area commands.
Figure 13:
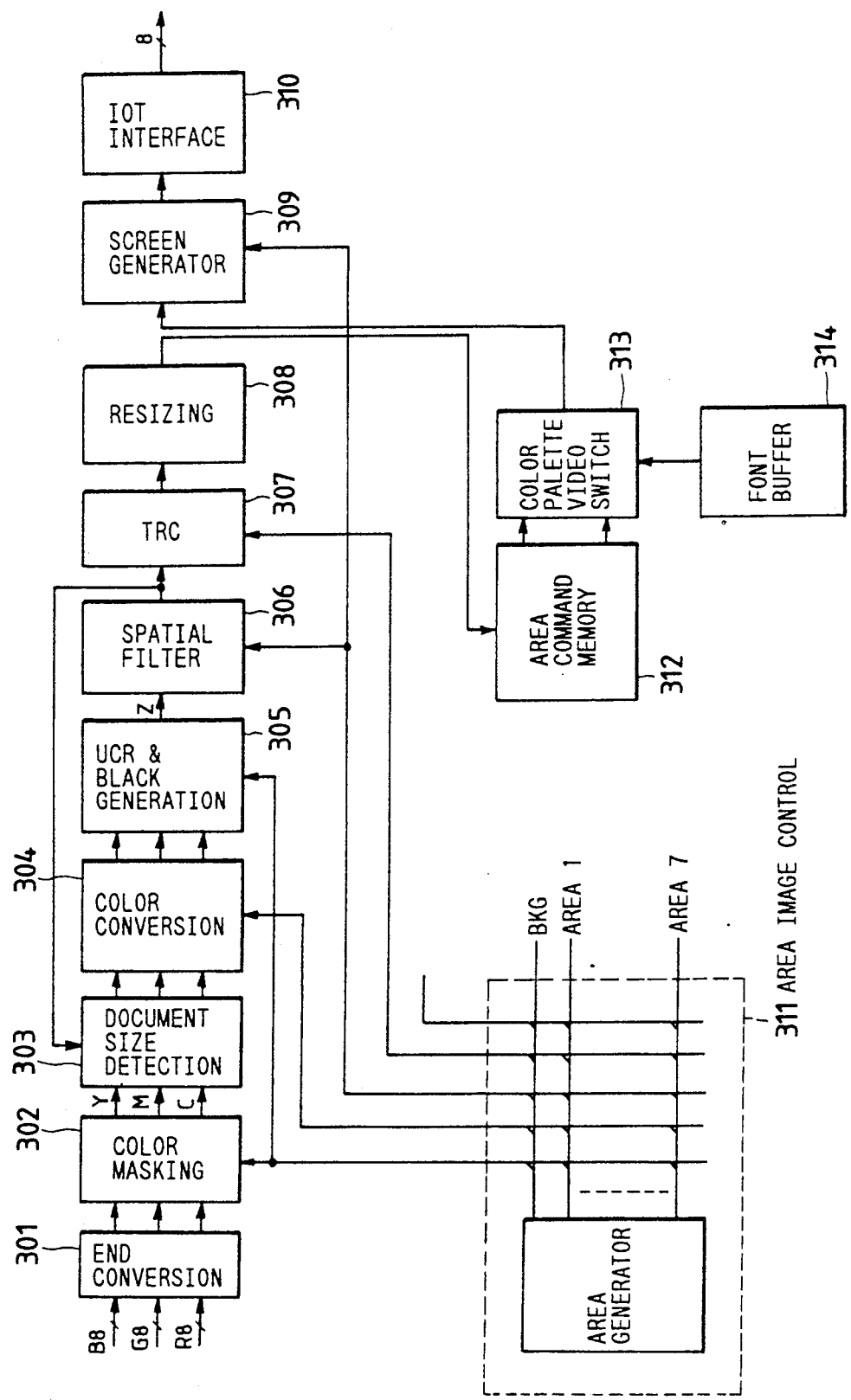
FIG. 13 is a diagram showing an example of the configuration of an IPS.
Figure 16:
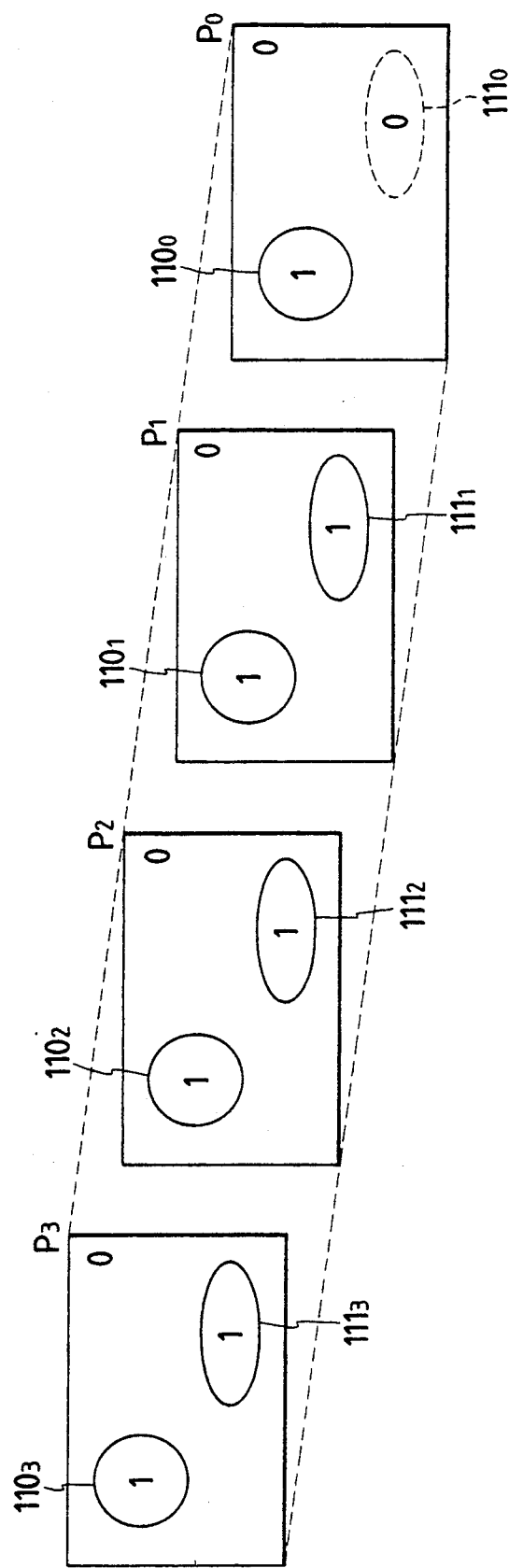
FIG. 16 is a diagram for illustrating a memory composition for the case where each of the area commands is composed of 4 bits.

As the result of the above procedure, area commands are stored in the plane memory 5. However, with that procedure alone, holes will occurring painting as in the prior art. To avoid this, the image processing circuit 4, subsequent to the end of the above procedure, enlarges the regions of planes $P_3$–$P_0$ where the area commands have been set (those regions are hereinafter referred to as "area command set regions"). As one can readily see from FIG. 15c, if data compression is effected to reduce the density from 16 dots/mm to 4 dots/mm, the size of the portion where a hole can occur will not exceed one pixel (after data compression) in both the fast and slow scan directions. Hence, it can be seen that if the area command set regions are enlarged by one bit in each of the fast and slow scan directions, the areas that are regarded as being interior to closed areas will become large enough to prevent the occurrence of "holes". The process for achieving this will proceed as follows. First, in each of the planes $P_3$–$P_0$ in the plane memory 5 shown in FIG. 2, the area command set region is shifted by one bit in the first predetermined direction, say, to the right as viewed in FIG. 2, and the shifted region is written into its own pixel with the logical sum being taken of the initial pixel value and the shifted pixel value. This step enables each of the area command set regions to be enlarged by one bit to the right as viewed in FIG. 2. In the next step, the area command set regions enlarged in the right direction are enlarged to the left as viewed in FIG. 2. In a similar manner, the area command set regions that have been enlarged in both the right and left directions are enlarged in the vertical direction both upward and downward, as viewed in FIG. 2.

The above-described procedures complete the process of generating area commands. In the prescanning mode, the image data read by the IIT is also fed into PLT 7 via a delay circuit but this can be neglected since PLT 7 is not in operation during prescanning.

Upon completion of the generation of area commands, the image processing circuit 4 notifies that event to CPU 1, which then instructs the IIT to start the main scanning for reading the document's image, and the image data thus reach is fed into PLT 7 via the delay circuit 8. In this instance, DMC 3 reads are commands from planes $P_3$–$P_0$ in the plane memory 5 via the image processing circuit 4 and those area commands are transferred to IRE 2 via FIFO 6. FIFO 6 consists of two rows in order to insure that when FIFOs in one row are executing command reading into IRE 2, area commands can be written into FIFOs in the other row.

Figure 5:
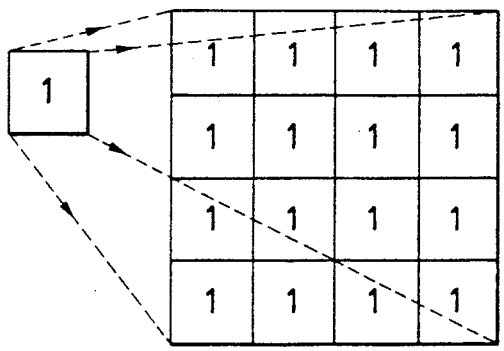
FIG. 5 is a diagram for illustrating density enlargement, or conversion to a higher density.

In IRE 2, the density of 4 dots/mm is converted to a higher density of 16 dots/mm, or the density at which image is read by the IIT. As a result, one pixel on the plane memory 5 is enlarged to a size of 4×4 pixels as shown in FIG. 5, and the area commands are output in the order in which pixels are read by the IIT. The configuration for effecting this density conversion to a higher density is well known in the start and will not be described in detail.

The area commands thus density-converted are supplied into PLT 7. In the density conversion mode, IRE 2 is also supplied with image data but this is neglected.

Figure 6:
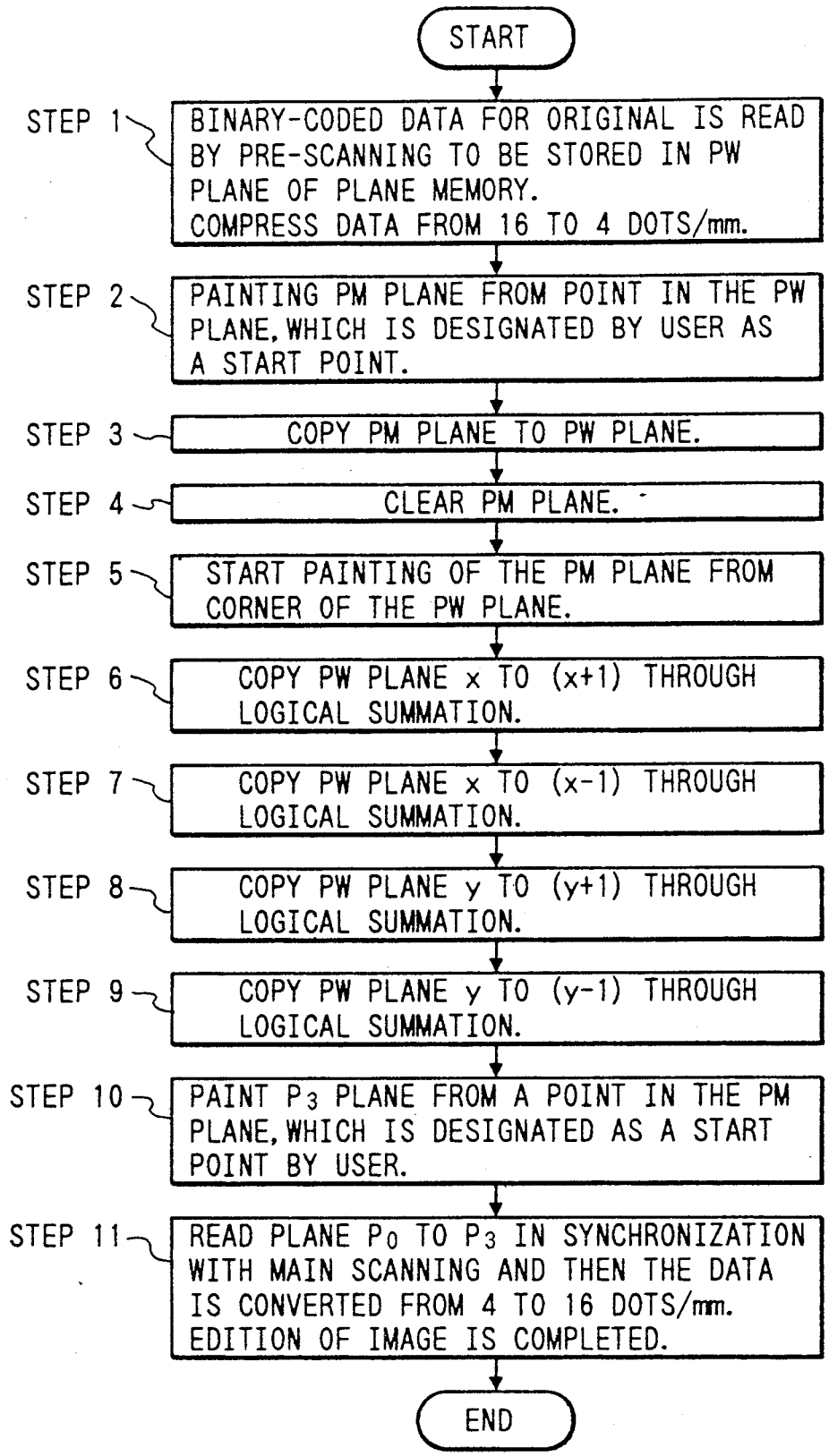
FIG. 6 is a flow chart showing the operation of a CPU with reference to FIGS. 7a to 7l which illustrate the states of planes of memory.
Figure 7G:
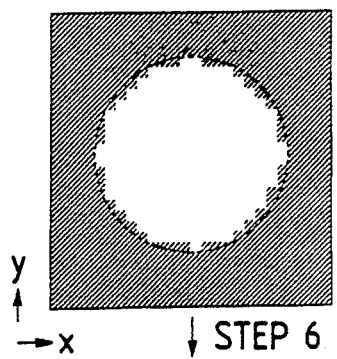
Figure 7H:
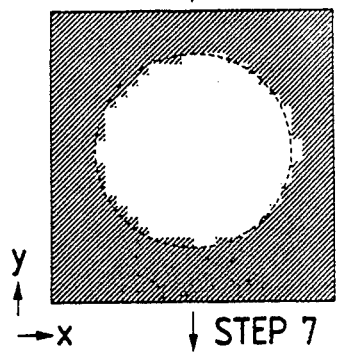
Figure 7I:
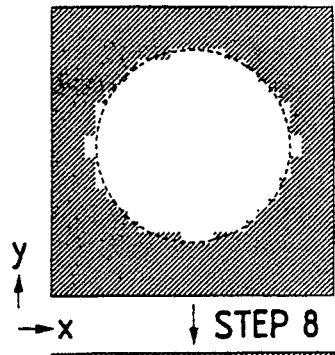
Figure 7J:
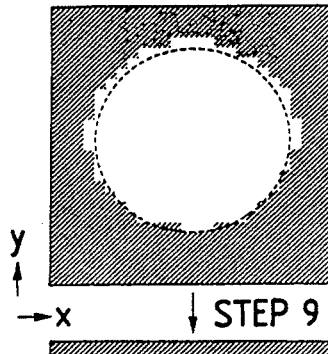
Figure 7K:
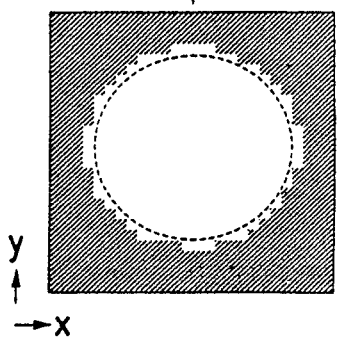
Figure 7I:
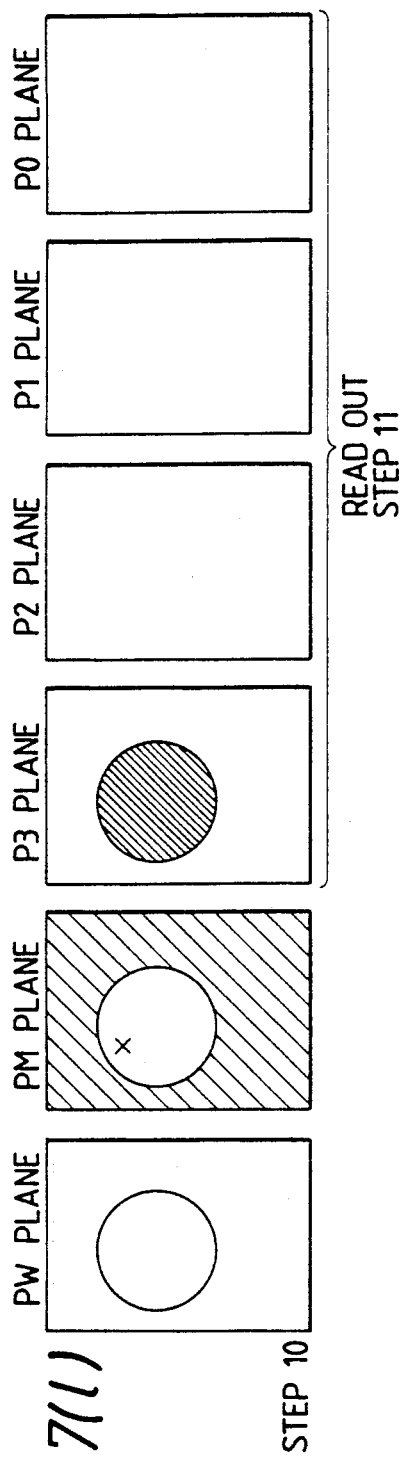

FIG. 6 is a flow chart showing the above described operation of the CPU 1 with reference to FIGS. 7a to 7l. FIGS. 7a to 7l illustrate the states of planes of memory, and FIGS. 7b to 7l show the states corresponding to the steps (1) to (11) of FIG. 6, respectively.

In the first step (1) of FIG. 6, a binary-coded data for an original is read by a preliminary scanning operation to be stored in a PW plane of the plane memory. In this case, the density of the data is compressed from 16 dots/mm to 4 dots/mm. In the second step (2), an operation for painting the PM plane is carried out from a point in the PW plane, which is designated by an user as a start point. In the step (3) The PM plane is copied to the PW plane, and then the PM plane is made clear in the step (4). In the step (5), the painting of the PM plane starts from the corner of the PW plane. In the step (6), the PW plane x is copied to (x+1) through logical summation and the PW plane x is copied to (x−1) through logical summation in the following step (7). In the steps (8) and (9), the PW plane y is copied to (y+1) and (y−1) through logical summation. Then, the plane P3 is painted from a point in the PM plane, which is designated by a user in the step (10). Finally, the planes $P_0$ to $P_3$ are subjected to reading operation in synchronization with a main scanning operation. Thereafter the data is converted from 4 dots/mm to 16 dots/mm, and the edition of image is completed in the step (11).

The image data and area commands to be supplied into PLT 7 must be composed of the same pixels, namely, they must be such as those located in the same positions on the document. To meet this condition, the delay circuit 8 is added to the system shown in FIG. 1 so as to absorb the time required for the area commands to be read out of the plane memory 5 and subjected to conversion to a higher density in IRE 2, whereby the area commands that are located in the same positions as the image data can be supplied into PLT 7. The delay circuit 8 may be composed of a pipeline register.

Figure 8:
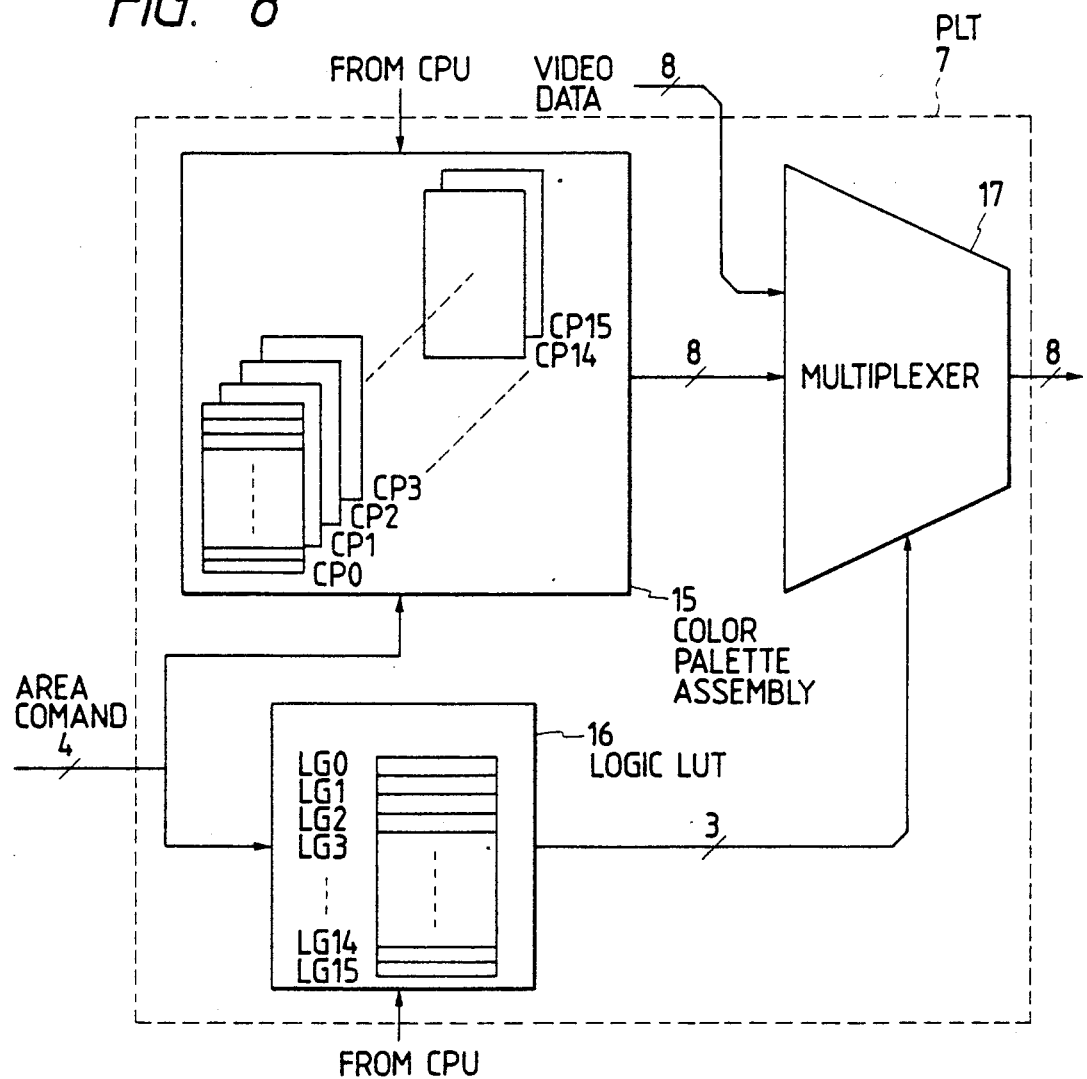
FIG. 8 is a diagram showing an example of the configuration of a palette circuit.

An example of the configuration of PLT 7 is shown in FIG. 8. As shown, PLT 7 is composed of a color palette assembly 15, a logic look-up table (a look-up table is hereinafter abbreviated as "LUT") 16 and a multiplexer 17. The color pallet assembly 15 is composed of 16 palettes $CP_0$–$CP_{15}$ each having a preset capacity, and density data for the respective development colors to reproduce the colors designated by the user are written at predetermined addresses in the each of the palettes $CP_0$–$CP_{15}$ by means of CPU 1. The densities for the respective development colors that are stored in palette $CP_0$ are assigned the value "0".

The logic LUP 16 is assigned 16 addresses $LG_0$–$LG_{15}$ and a job command for the job that is to be executed by the multiplexer 17 in order to implement the edit process designated by the user is written into each of the addresses $LG_0$–$LG_{15}$ by means of CPU 1. The job command written into the address $Lg_0$ is for slowing the image data in the multiplexer 17. According to FIG. 8, the output job command from the logic LUX 16 consists of three bits, namely, a maximum of 8 jobs are to be executed by the multiplexer 17. However, it will be apparent to one skilled in the art that the bit number of the job command is variable with the number of jobs to be executed by the multiplexer 17. This may be illustrated more specifically below. First suppose that the user has selected a painting mode for filling the closed area 10 in FIG. 2a with a red color, with area command $F_H$ being assigned to that closed area 10 by means of CPU 1. Then, the density values of the respective development colors necessary for reproducing a red color are written by CPU 1 into predetermined addresses on the palette $CP_{15}$ in the color palette assembly 15, whereas the job command for painting is written into the address $LG_{15}$ in the logic LUT 16. Also suppose that the user has assigned area command $B_H$ to the closed area 11 in FIG. 3a and that he has instructed painting with a green color. In this case, the density values of the respective development colors necessary for reproducing a green color are written by CPU 1 into predetermined addresses on the palette $CP_{11}$ in the color palette assembly 15, whereas the job command for painting is written into the address $LG_{11}$ in the logic LUT 16. Needless to say, the density data for development colors to be read from the color palette assembly 15 should correspond to the colors to be developed by the currently executed development process. This may be illustrated more specifically below on the assumption that a development cycle for M (magenta) is currently executed. If the area command entered into PLT 17 is $O_H$, or representing pixels exterior to the designated closed area, the color palette assembly 15 is accessed at $CP_0$ to output a magenta density value of "0" while, at the same time, the logic LUT 16 is accessed at address $Lg_0$ to output a job command for slewing image data in the multiplexer 17. Hence, image data is produced from the multiplexer 17. If the entered area command is $F_H$, or representing pixels interior to the closed area 10 shown in FIG. 3a, the color palette assembly 15 is accessed at $CP_{15}$ to output magenta density values for reproducing a red color while, at the same time, the logic LUT 16 is accessed at address $LG_{15}$ to output a command for executing the painting operation, or a job command for selecting the output of color palette assembly 15 in the multiplexer 17. Hence, magenta density values for reproducing a red color are produced from the multiplexer 17. Similar procedures are taken in the development processes for other development colors and the output from the multiplexer 17 is supplied into the IOT via the screen generator 309 and IOT interface 310 (see FIG. 11) for subsequent color development.

By following the above-described procedures, the interior of a designated closed area can be filled with a designated solid color without creating any holes.

Figure 17A:
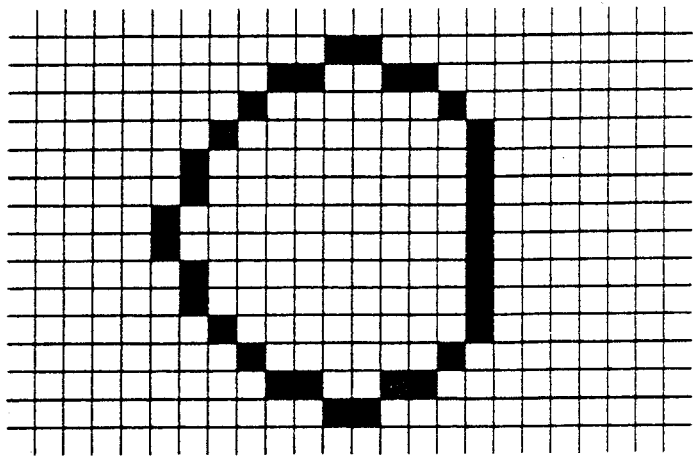
FIG. 17(a) to 17(c) illustrates the reason for the occurrence of a "hole" in the painting operation implemented by the prior art image recording apparatus.
Figure 17B:
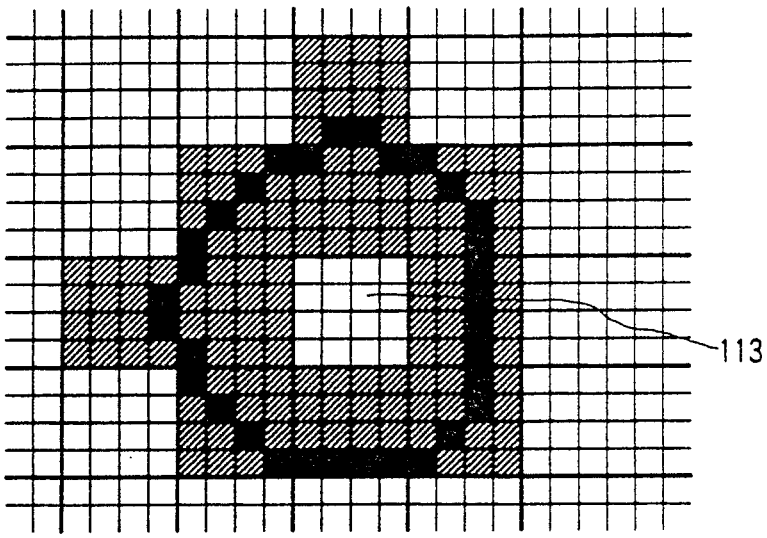
Figure 17C:
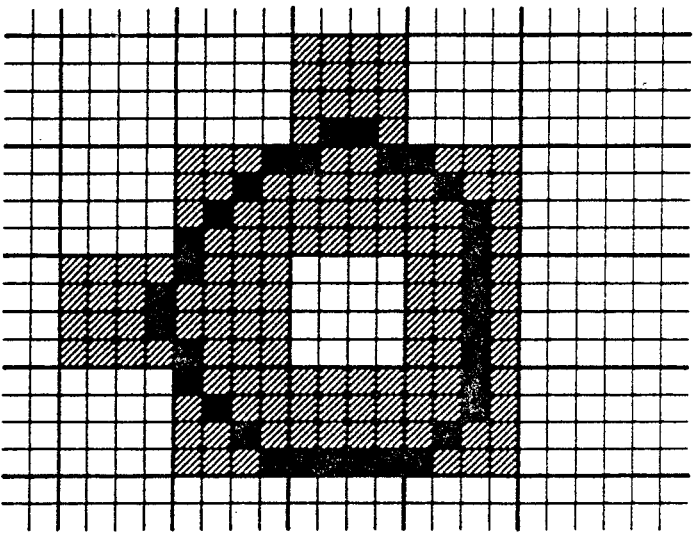

Making some comments here on the thickness of the contour line of a closed area may be in order. In the example illustrated in FIG. 17, if the area command set regions are successively enlarged in four directions (to the right and left, as well as upward and downward) in the manner already described, the scope of painting will go beyond the closed area of interest. In fact, however, lines as thin as 1/16 mm are seldom used and the line thickness is mostly 0.25 mm and greater. Therefore, even if the area command set regions are enlarged by one bit in the four directions, the scope of painting will in no case exceed the contour of the closed area. Even in the case of a closed area enclosed with a 0.1-mm thick contour line, the amount of excessive painting will be very small and 0.15 mm at maximum. In addition, the contour of that closed area is copied in black and no serious defect that is comparable to "holes" will occur.

Figure 9A:
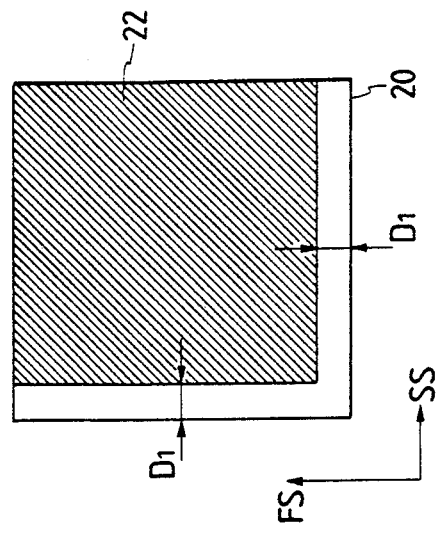
FIG. 9(a) to 9(b) illustrates the amount of delay of image data, as well as the position and amount of a "hole"
Figure 9B:
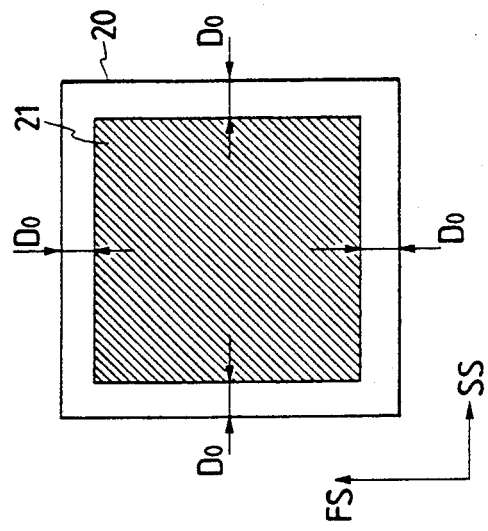

While an image processing system for use with image recording apparatus according to an embodiment of the present invention has been described on the foregoing pages, it should be understood that the present invention is by no means limited to that particular embodiment and that various modifications can be made without departing from the spirit of the invention. In the embodiment described above, the amount by which image data is delayed with the delay circuit 8 is set to be equal to the time of processing on area commands, so the image data and area commands to be entered into PLT 7 are adapted to coincide with each other in terms of pixel positions. Hence, the amount of a "hole", $D_0$, or the difference between the contour of a closed area as indicated by 20 in FIG. 7a and the area 21 to be painted, is equivalent to a maximum of 4 pixels in image data, so that the region for setting area commands need be enlarged by one bit in both horizontal and vertical directions. However, the region to be painted can be moved around within the closed area of interest by adjusting the amount by which the image data is delayed with the delay circuit 8 and/or by adjusting the timing of image reading with the IIT. It is worth particular mention here that if the region to be painted which is indicated by 22 in FIG. 9b is brought into registry with two directions of the contour 20 of the closed area, the amount of a "hole" $D_1$ is equivalent to a maximum of 8 pixels in image data, so that the region for setting area commands may be enlarged by two bits in only two directions. By so doing, the processing time can be shortened compared to the illustrated embodiment in which the area command set region is enlarged in the four directions.

In the embodiment described above, the region for setting area commands is enlarged by one bit but this is not the sole case of the present invention. Stated more specifically, the density of pixels is compressed from 16 dots/mm to 4 dots/mm in the embodiment, so the area command set region need only to be enlarged by one bit. However, if the amount of density conversion is different, the region for setting area commands may be enlarged by a corresponding number of bits and the only requirement that has to be satisfied is that the area command set region be enlarged by a sufficient amount to prevent the occurrence of "holes".

In the embodiment described above, the multiplexed 17 is so adapted as to select the output of color palette assembly 15 if a job command for executing the painting operation is entered. However, this approach has the disadvantage that characters, symbols and other marks that are drown in black within the closed area will not be copied. To avoid this problem, the multiplexed 17 may be modified in such a way than when a job command for executing the painting operation is entered, it compares the density value of the image data with the output density value from the color palette assembly 15 and selectively outputs the higher density value. According to this modification, if the density value of the image data and the output density value produced from the color palette assembly 15 are as indicated by 25 and 26, respectively, in FIG. 10, the multiplexed 17 will output the density value that is represented by a thick line in FIG. 10. Obviously, characters, symbols and other marks that are drawn i black within the closed area will be copied unaltered.

In the embodiment described above, the delay circuit 8 is composed of a pipeline register. It should however be noted that the delay circuit 8 can also be composed of a line register as shown schematically in FIG. 11. The line register shown in FIG. 11 is configured in such a way that image data is written into a line memory 30 in response to the supply of a video clock at a write-clock terminal WCLK on the condition that a line sync signal LS has been entered at a write-enable terminal WE, and that the image data is read from the line memory 30 in response to the supply of a video clock at a read-clock terminal RCLK on the condition that a line sync signal LS has been entered at a read-enable terminal RE. The timing of entry of the line sync signal LS at the read-enable terminal RE is settable to a desired value by means of a delay setting circuit 31. Therefore, by adjusting the amount by which the line sync signal LS is delayed with the delay setting circuit 31, the amount of offset between the time at which image data is entered into the multiplexed 17 and the time at which the corresponding pixel in an area command is entered can be set to a desired level, and the state of delay that can be obtained may be as shown in FIG. 9a or FIG. 9b.

In the embodiment described above, the region in which area commands have been set is intended to be enlarged by taking the logical sum of each shifting by one bit. However, this is not the sole case of the present invention and various modifications can be made. In one example, bit search is effected in planes $P_3$–$P_0$ and a bit that is assigned the value "0" and which is adjacent a bit assigned the value "1" may be reassigned the value "1". Alternatively, the image processing circuit 4 may be dedicated to perform conventional processes without enlarging the region in which area commands have been set and, instead, hardware for enlarging the region of bits "1" may be connected to the output of IRE 2. In other words, any means can be provided in the system of the present invention as long as it is capable of enlarging the regions in which area commands have been set.

As will be understood from the foregoing description, the present invention insures that the region in which area commands are set can be enlarged in one or more directions in which "holes" are to occur and this contributes to a smaller capacity of the memory for storing area commands. Hence, an image recording apparatus that permits painting operations to be performed without producing "holes" can be offered by the present invention at low cost.

What is claimed is:

1. An image recording apparatus comprising an image input terminal, an image processing system, an image output terminal, a user interface, a coordinate input means capable of inputting the coordinates of a point on a document, and a control unit that manages the overall operation of the apparatus by coordinating the operations of the individual components, wherein said image processing system comprises a density conversion means for compressing density of an image data, an area command generating means for generating an area command based on both the output of said density conversion means and the coordinates of a point designated by said coordinate input means, a memory means for storing the area command, means for converting the density of the area command read out from said memory means to a higher density, and means for enlarging the region set by the area command by a predetermined number of bits in a predetermined direction in which an uncolored portion is to occur.

2. The image recording apparatus as defined in claim 1 wherein said density conversion means compresses the density of an image data from a density of 16 dots/mm to a density of 4 dots/mm.

3. The image recording apparatus as defined in claim 1 wherein said area command generating means generates an area command representing at least one designated closed area 4. The image recording apparatus as defined in claim 1 wherein said memory means is a random access memory having a work plane and a mask plane both acting as a work area, and four planes in which the area command is stored.

5. The image recording apparatus as defined in claim 4 wherein said enlarging means shifts the region set by the area command by one bit in a first direction in each of said planes and then write the shifted region thereinto with the logical sum being taken of an initial pixel value and the shifted pixel value.

6. The image recording apparatus as defined in claim 1 further comprising a delay means to absorb a time required for the area commands to be read out of said memory means and subjected to conversion to a higher density in said image processing means.

7. The image recording apparatus as defined in claim 6 wherein said delay means is a pipeline register.

8. The image recording apparatus as defined in claim 6 wherein the amount of delay of image data which is caused by said delay means is set to be equal to the time of processing on the area commands.

* * * * *